United States Patent [19]

Brown

[11] Patent Number: 5,332,001
[45] Date of Patent: Jul. 26, 1994

[54] SEXLESS BALL VALVE COUPLING

[75] Inventor: Albert W. Brown, Newport Beach, Calif.

[73] Assignee: J. C. Carter Company, Inc., Glendale, Calif.

[21] Appl. No.: 100,374

[22] Filed: Aug. 2, 1993

[51] Int. Cl.$^5$ .............................................. F16L 37/28
[52] U.S. Cl. .................... 137/614.06; 251/96; 251/149.9
[58] Field of Search ............... 137/614.06; 251/149.9, 251/95–97

[56] References Cited

U.S. PATENT DOCUMENTS

| | | | |
|---|---|---|---|
| 3,159,180 | 12/1964 | Courtof et al. | 137/615.06 |
| 3,330,313 | 7/1967 | Rosell | 137/614.06 |
| 4,109,673 | 8/1978 | Horowitz et al. | 251/96 |
| 4,426,063 | 1/1984 | Bormioli | 137/614.06 |
| 4,438,779 | 3/1984 | Allread | 137/614.06 |
| 5,090,449 | 2/1992 | Fournier et al. | |
| 5,099,883 | 3/1992 | Maiville | |

FOREIGN PATENT DOCUMENTS

| | | | |
|---|---|---|---|
| 80822 | 4/1956 | Denmark | 251/96 |
| 646448 | 11/1950 | United Kingdom | 137/614.06 |

Primary Examiner—A. Michael Chambers
Attorney, Agent, or Firm—Kelly Bauersfeld & Lowry

[57] ABSTRACT

A ball valve coupling includes a pair of identical ball valve units adapted for mounting onto a respective pair of fluid flow conduits, such as fuel hoses in a fuel handling environment. The two ball valve units are releasibly connected in in-line, face-to-face relation by interengageable lock lugs, and further include individual ball valves rotatable between open and closed positions to control fluid flow therethrough. Each ball valve unit includes a safety lock-out key engaged by a lock lug on the other ball valve unit as the coupling is assembled, wherein the lock-out key precludes ball valve rotation to the open position unless the two ball valve units are fully and properly engaged in sealed relation. The lock-out key of each ball valve unit further precludes coupling disassembly unless the ball valve is first returned to the closed position. In addition, a telescopic valve handle on each ball valve unit is spring-loaded to a normal compact collapsed position with a stop pin oriented for normally locking the valve handle in the selected open or closed position. The valve handle is longitudinally extensible to release the stop pin and permit ball valve rotation with an increased moment arm.

16 Claims, 5 Drawing Sheets

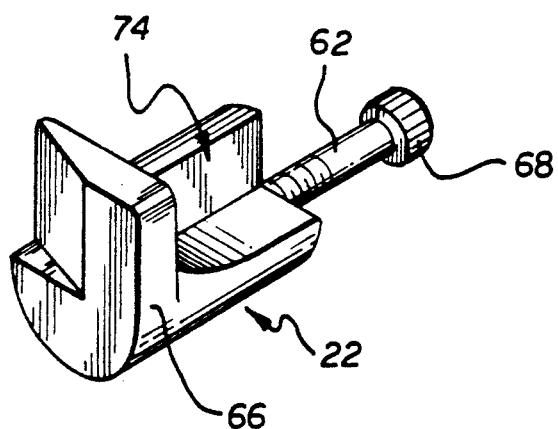
FIG. 3
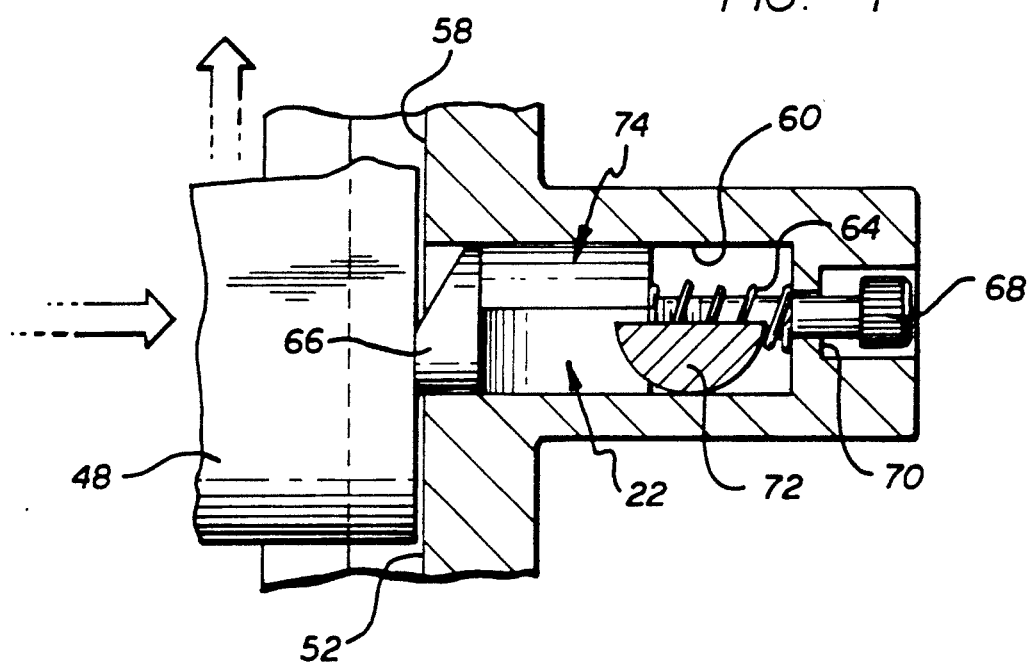
FIG. 4
FIG. 5

SEXLESS BALL VALVE COUPLING

BACKGROUND OF THE INVENTION

This invention relates generally to ball valve couplings of the type having an identical pair of ball valve units adapted for releasible connection in in-line, face-to-face relation, for use in fluid handling or fluid transfer applications. More specifically, this invention relates to an improved ball valve coupling having lock-out means for preventing valve opening unless the ball valve units are fully and properly engaged in fluid-sealed relation, and for preventing disassembly of the ball valve units unless the valves are closed.

Ball valve couplings are generally known in the art for use in releasible in-line connection of a pair of fluid flow conduits. The ball valve coupling typically comprises a pair of ball valve units adapted for mounting onto the ends of a pair of fluid flow conduits, wherein the ball valve units in turn include quick connect coupling members to accommodate relatively rapid and easy interconnection in fluid-sealed relation. The thus-assembled ball valve units additionally include a corresponding pair of rotatable ball valves movable between closed and open positions for correspondingly preventing and permitting fluid flow. A variety of ball valve configurations have been proposed in the prior art, with a view toward reducing or eliminating significant residual volume between the ball valves in the closed positions, thereby reducing or eliminating undesired fluid spillage when the ball valve units are disassembled. Ball valve couplings of this general type are used in a wide range of fluid handling applications, particularly such as a fuel handling environment.

In recent years, considerable design emphasis has focused upon ball valve couplings of a so-called sexless or unisex geometry wherein two matching or identical ball valve units are provided for relatively quick and easy releasible interconnection in an in-line, face-to-face relation. The provision of a sexless ball valve coupling beneficially ensures that any two ball valve units in a fluid handling environment may be assembled and disassembled quickly and easily, without limiting the assembled coupling to traditional male-female structures. In addition, such sexless couplings have included safety features intended to minimize fluid spillage attributable to attempted fluid flow prior to full and proper sealed interconnection of the ball valve units, or attempted disassembly of the ball valve units prior to full closure of the ball valves. See, for example, U.S. Pat. No. 4,438,779 which discloses a sexless ball valve coupling wherein each ball valve unit includes an extensible safety pin which moves with the associated ball valve in a manner intended to prevent ball valve opening unless a pair of ball valve units are fully engaged, and to prevent disassembly of the ball valve units unless the respective ball valves are closed. While safety features of this type have provided an advance in the construction and operation of sexless ball valve couplings, the requirement for coordinated concurrent movement of the safety pin and the ball valve can, in some failure modes, permit partial opening of the ball valve before improper connection of the ball valve units is detected. This creates a risk of fluid leakage, wherein such fluid leakage is highly undesirable in some applications such as fuel handling environments.

There exists, therefore, a significant need for further improvements in ball valve couplings of the so-called sexless type, particularly with respect to providing a substantially failsafe lock-out means for preventing ball valve movement to an open position unless a pair of the ball valve units are fully engaged, and for preventing disassembly of the ball valve units unless each ball valve is fully closed. The present invention fulfills these needs and provides further related advantages.

SUMMARY OF THE INVENTION

In accordance with the invention, an improved ball valve coupling of the so-called sexless type includes a pair of identical ball valve units adapted for quick and easy releasible interconnection in an in-line, face-to-face relation. The ball valve units are adapted for mounting onto the ends of a corresponding pair of fluid flow conduits, such as fuel hoses, and include ball valves rotatable between open and closed positions for respectively permitting and preventing fluid flow therethrough. A safety lock-out key is provided on each ball valve unit to prevent movement of the associated ball valve to an open position, unless and until the two ball valve units are fully and properly engaged in a sealed, in-line connection. In addition, the lock-out key of each ball valve unit obstructs and prevents disconnection of the assembled ball valve units, unless the associated ball valve is first returned to a closed position.

The two ball valve units each comprise an open-ended valve body adapted for mounting onto the end of a fluid flow conduit, such as a fuel supply hose. The ball valve is rotatably mounted within the valve body for movement between the closed and open positions. A pivot shaft protrudes from the ball valve to an externally accessible valve handle which is positioned for manual rotation to displace the ball valve between the closed and open positions. One or more lock lugs protrude outwardly from an end face of the valve body for slide-fit reception into one or more mating lug recesses formed in the end face of the adjacent ball valve unit. The two ball valve units are interconnected by fitting the respective lock lugs of each ball valve unit into the lug recesses of the other ball valve unit, and then coaxially rotating the two ball valve units in opposite directions to displace the lock lugs into undercut lock channels.

In accordance with the preferred form of the invention, each ball valve unit includes the safety lock-out key which is spring-loaded to normally project into and thus partially occupy a lug recess in the end face of the valve body. The lock-out key is positioned to be engaged by a lock lug on the opposite ball valve unit, in the course of ball valve unit assembly. The lock lug pushes the lock-out key to a retracted position permitting lock lug entry into the lug recess, and further displacement of the lock lug rotationally to the undercut lock channel. When the lock lug reaches a position within the lock channel, corresponding with full and proper sealed interconnection of the two ball valve units, the lock lug is rotated beyond the safety lock-out key which spring-returns to the normal position protruding into the lug recess.

A stem pin is carried by the associated ball valve in operative relation with the safety lock-out key to permit or prevent ball valve rotation, in accordance with the open or closed position of the ball valve. More specifically, when the lock-out key is retracted by the engaging lock lug, prior to full engagement of the two ball valve units, the lock-out key physically obstructs rotational movement of the stem pin, and thereby physically prevents ball valve rotation from the closed position to the open position. When full ball valve unit engagement is achieved, with the lock-out key spring-returned to its normal advanced position, the stem pin is unobstructed and ball valve movement to the open position is permitted. When the ball valve is open, the stem pin obstructs retraction of the lock-out key which thus correspondingly obstructs and prevents movement of the lock lug from the fully engaged position. Upon reclosure of the ball valve, the stem pin is reoriented to permit lock-out key retraction. Subsequent disassembly of the ball valve units is accompanied by engagement of the lock lug with a ramped face on the lock-out key, resulting in forced retraction of the lock-out key to accommodate disassembly of the ball valve units.

In accordance with further aspects of the invention, each ball valve unit includes a telescopic valve handle having spring means for normally retaining the valve handle in a relatively compact, collapsed configuration. A stop pin on the valve handle seats within a detent on the valve body for normally locking the valve handle against rotation from the selected open or closed position. The valve handle is adapted to be extended longitudinally to release the stop pin from the detent, and further to provide an elongated valve handle structure for facilitated ball valve rotation with increased moment arm.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is an enlarged perspective view showing a safety lock-out key for use in each of the ball valve units;

FIG. 4 is an enlarged fragmented and somewhat schematic sectional view illustrating engagement and retraction of the safety lock-out key in the course of assembly of the pair of ball valve units;

FIG. 5 is a fragmented sectional view similar to FIG. 4, and showing return advance movement of the safety lock-out key as the ball valve units reach a fully engaged position;

DETAILED DESCRIPTION OF THE PREFERRED EMBODIMENT

Figure 1:
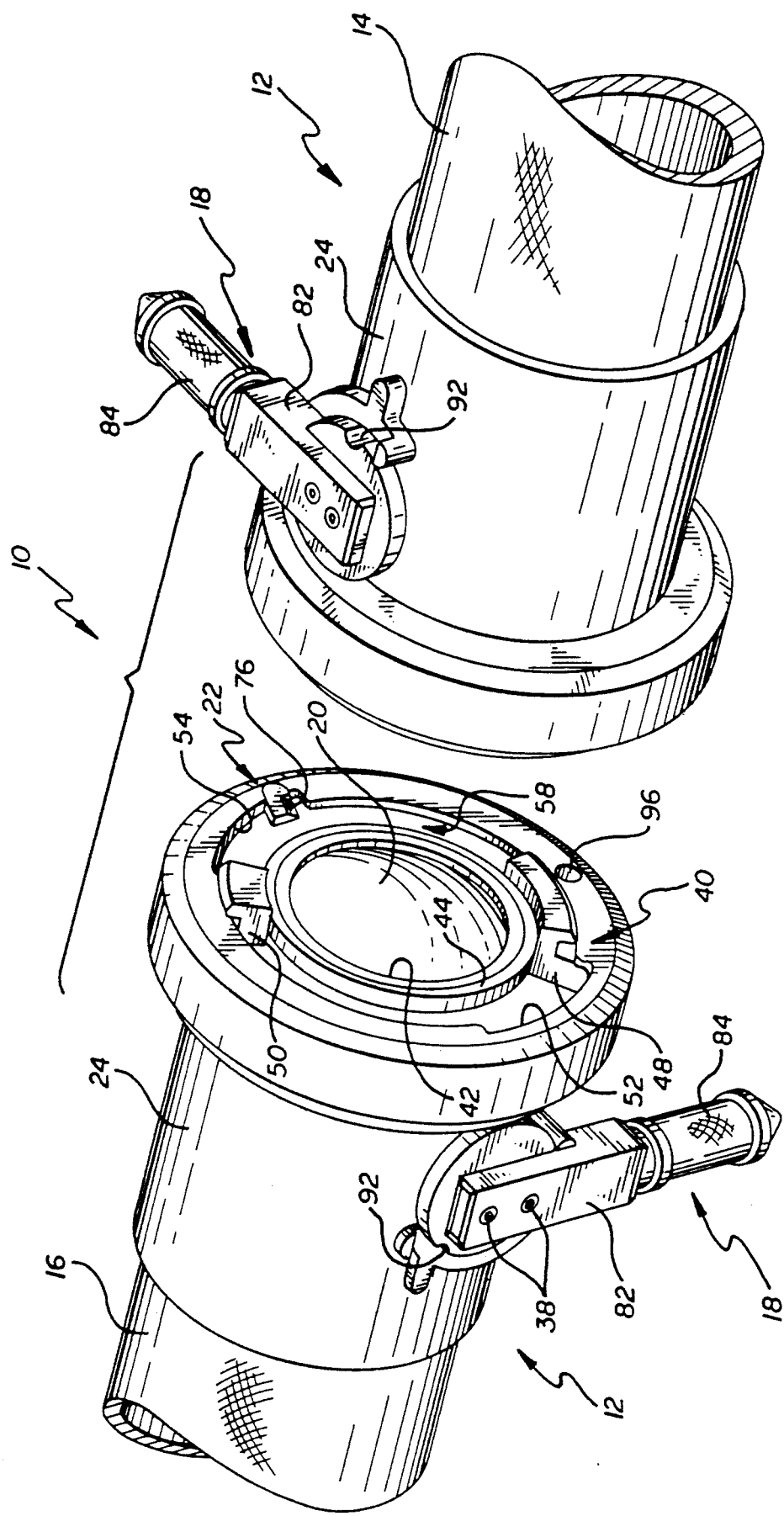
FIG. 1 is a perspective view illustrating a sexless ball valve coupling embodying the novel features of the invention, and depicting a pair of identical ball valve units in face-to-face relation for releasible interconnection.

As shown in the exemplary drawings, an improved ball valve coupling referred to generally by the reference numeral 10 comprises an identical pair of ball valve units 12 adapted for mounting onto the ends of a pair of fluid flow conduits 14 and 16. The matched ball valve units 12 each include an externally accessible valve handle 18 for rotating a ball valve 20 between closed and open positions for respectively preventing and permitting fluid flow. The ball valve units 12 include quick connect means for quickly and easily assembling the ball valve units in in-line, face-to-face relation, whereupon the respective ball valves 20 can be opened to permit fluid flow between the conduits 14 and 16. A safety lock-out key 22 is provided on each of the two ball valve units and functions to prevent ball valve movement to an open position unless the ball valve units 12 are fully and properly engaged, and further to prevent disassembly of the ball valve units 12 unless their respective ball valves are in the closed positions.

The ball valve units 12 each comprise a generally cylindrical valve body 24 having swivel joint clamp-fit mounting means 26 for secure mounting onto the end of the associated flow conduit 14, 16, by means of conduit end fittings 14' and 16'. The ball valve 20 is supported within the valve body 24 by coaxially mounted upper and lower stem members 28 and 30 to permit rotation of the ball valve between the closed and open positions. The ball valve is retained between annular seal rings 32 and 34 which engage the spherical exterior of the ball valve upon rotation thereof between the closed and open positions. The outboard seal rings 34 are shown biased by springs 35 into fluid-tight sealed relation with the ball valves. A circular bore 36 extends through the ball valve 20 for coaxial alignment with the associated flow conduit 14, 16 when the ball valve is in the open position. This bore 36 is oriented to extend crosswise with respect to the associated flow conduit when the ball valve is in the closed position. As shown best in FIG. 2, the upper stem member 28 protrudes through the valve body 24 and is connected by screws 38 or the like to the valve handle 18 which can be manually operated to displace the ball valve between the closed and open positions.

The ball valve units 12 are designed for quick and easy connection in a sealed manner to accommodate fluid flow between the conduits 14 and 16. In this regard, and in general terms, each ball valve unit includes an outboard end face 40 having a central flow passage 42 formed therein and normally obstructed by the ball valve 20 in the closed position. An annular face seal 44 is seated in an annular grove 46 surrounding the central flow passage 42, wherein the face seal 44 is positioned for sealed compression-fit engagement with a counterpart face seal 44 on the adjacent ball valve unit 12, when the two ball valve units are interconnected. In this interconnected geometry, as will be described in more detail, the spherical surface of each ball valve 20 in the closed position protrudes substantially to the plane of the end face 40, thereby minimizing residual volume between the assembled ball valve units.

The quick connect means on the ball valve units 12 comprise a pair of different-sized lock lugs 48 and 50 in combination with a corresponding pair of different-sized lug recesses 52 and 54. The lock lugs 48, 50 have an arcuate, part-circle shape of different arcuate span or width to project axially from the associated end face 40, terminating in a radially out-turned lock finger 56. These lock lugs 48, 50, including the out-turned fingers 56 thereon, have a size and shape for axial slide-fit reception into the counterpart lug recesses 52, 54 defined in the end face 40 of the adjacent ball valve unit 12. When the lock lugs of the two ball valve units are fully extended into the lug recesses, such that the face seals 44 are compressively engaged, the two ball valve units 12 are designed for coaxial rotation one relative to the other to displace the lock fingers 56 into undercut lock channels 58. The lock fingers 56 on the lock lugs are thus axially retained within the lock channels 58 by the compressive action of the face seals 44, resulting in a secure and sealed coaxial interconnection between the two ball valve units.

The safety lock-out key 22 of each ball valve unit 12 cooperates with the lock lug 48 on the opposite ball valve unit 12 to prevent ball valve movement to the open position, unless and until the two ball valve units are fully and properly engaged in a fluid-sealed manner. In addition, the safety lock-out key 22 prevents separation or disassembly of the interconnected ball valve units 12, unless the associated ball valve 20 is in a closed position. With this construction, ball valve displacement to or even partially toward an open position is positively prevented at undesired times.

Figure 2:
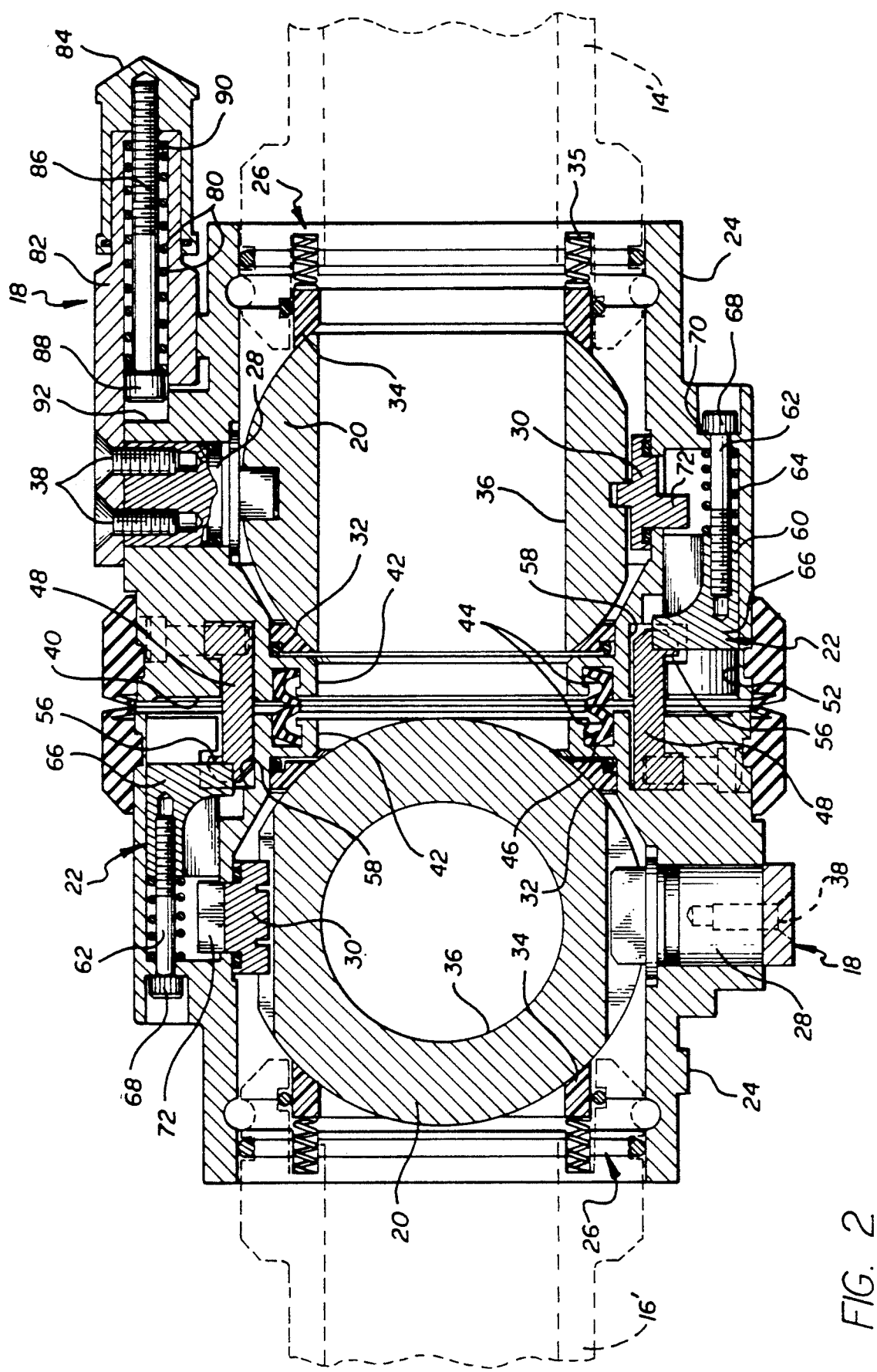
FIG. 2 is a longitudinal sectional view illustrating the ball valve units in assembled relation.

The safety lock-out key 22 for each ball valve unit 12 comprises an elongated key member mounted for sliding displacement along a key track 60 formed in the associated valve body 24. As shown in FIG. 2, the key track 60 extends from a position generally aligned with the lower stem member 30, to a position intersecting the lug recess 52 at a location adjacent the entrance to the associated lock channel 58. A guide pin 62 protrudes rearwardly from the key 22, with a compression spring 64 reacting between a portion of the valve body 24 and a rear face of the key 22 for normally positioning a head 66 of the key 22 in an advanced position protruding into the lug recess 52. A cap 68 on the guide pin 62 is drawn by the spring 64 into normal engagement with a shoulder 70 on the valve body 24 thereby defining a stop against forward or advancing displacement of the lock-out key 22.

When the two ball valve units 12 are fitted together, the safety lock-out key 22 of each ball valve unit is engaged by the lock lug 48 of the opposite ball valve unit. With the ball valve 20 in a closed position, as shown in FIG. 4, the lock lug 48 physically depresses or retracts the key 22 with a pushing action against the spring 64 for retraction into the track 60, thereby permitting subsequent lug rotation to the adjacent lock channel 58. In this regard, with the ball valve 20 in the closed position, a semicircular stem pin 72 on the lower stem member 30 is oriented for reception into an open keyway 74 on the key 22, in the course of retraction movement of the lock-out key 22. When the lock lug 48 is fully engaged as indicated by displacement to the lock channel 58, as shown in FIG. 5, the key 22 is free for spring-loaded return to protrude partially into the lug recess 52.

Figure 6:
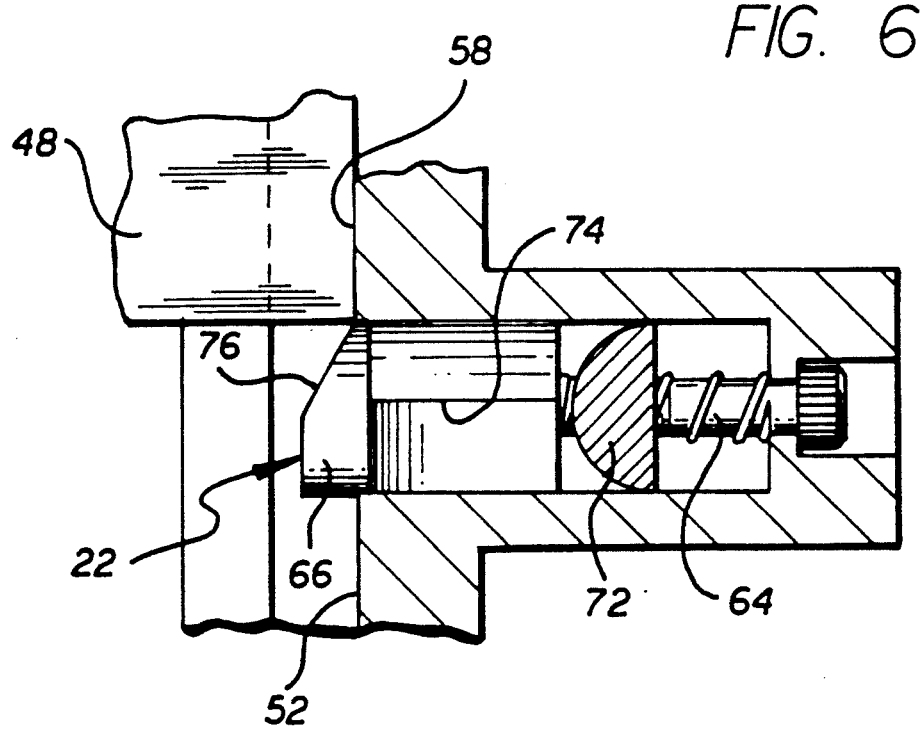
FIG. 6 is a fragmented sectional view similar to FIGS. 4 and 5, and illustrating operation of the safety lock-out key to prevent premature disassembly of the interconnected ball valve units.

The retracted lock-out key 22 prevents rotation of the ball valve 20 to the open position, until the ball valve units are fully engaged. That is, as shown in FIG. 4, the stem pin 72 is disposed off-axis relative to the axis of rotation of the ball valve, for reception at least partially into the keyway 74 when the lock-out key 22 is retracted, whereby the lock-out key precludes ball valve rotation to the open position. However, as shown in FIG. 5, the lock-out key 22 returns by spring action to the advanced position when full unit interengagement is achieved, whereupon the stem pin 72 is disposed aft of the key 22, thereby permitting ball valve rotation to the open position. Such movement of the ball valve to the open position is shown in FIG. 6 and reorients the stem pin 72 in a position blocking retraction of the lock-out key 22. Accordingly, while fluid flow may occur by opening both ball valves when the ball valve units are fully engaged, subsequent disassembly of the ball valve units is prevented while the ball valves are open, since the protruding head 66 of the lock-out key 22 blocks removal of the lug 48 from the lock channel 58.

Figure 7:
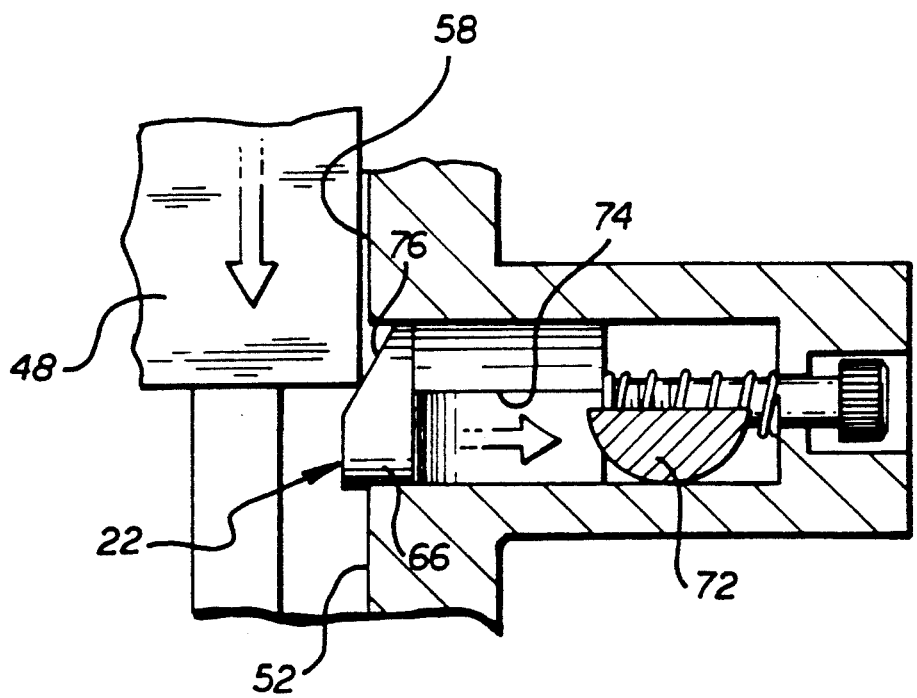
FIG. 7 is a fragmented sectional view similar to FIGS. 4-6, and illustrating retraction movement of the safety lock-out key to permit disassembly of the ball valve units.

When the ball valve is returned to the closed position, as depicted by the orientation of the stem pin 72 in FIG. 7, the stem pin 72 is again aligned for reception into the keyway 74, thereby permitting retraction movement of the lock-out key 22. Return displacement of the lock lug 48 toward a disassembled position causes a leading edge thereof to engage a ramped face 76 on the key 22 to retract the key against the spring 64, and thereby move the key to an out-of-the-way retracted position permitting disassembly of the ball valve units. The ramped face 76 is appropriately angled toward the undercut channel 58 such that a leading edge of the lug 48 smoothly engages the lock-out key for depression thereof as the lug 48 is rotated to the lug recess.

In accordance with a further aspect of the invention, the valve handle 18 on each ball valve unit 12 has a telescopic construction biased by a spring 80 toward a normally collapsed or compact configuration. More specifically, an inner handle member 82 is connected by the screws 38 to the associated ball valve, with an outer handle member 84 slidably fitted thereon. A stop pin 86 comprises an extension member which interconnects the two handle members 82, 84, with the spring 80 reacting between a head 88 on the stop pin and a shoulder 90 on the inner handle member 82 for urging the assembled components to the collapsed configuration (FIG. 2). In this collapsed state, the head 88 of the stop pin 86 seats into a detent or recess 92 or 94, in accordance with the selected open or closed position of the valve. Thus, the stop pin 86 provides a simple mechanism for normally locking the valve in the selected open or closed position, thereby protecting against inadvertent ball valve rotation.

Figure 8:
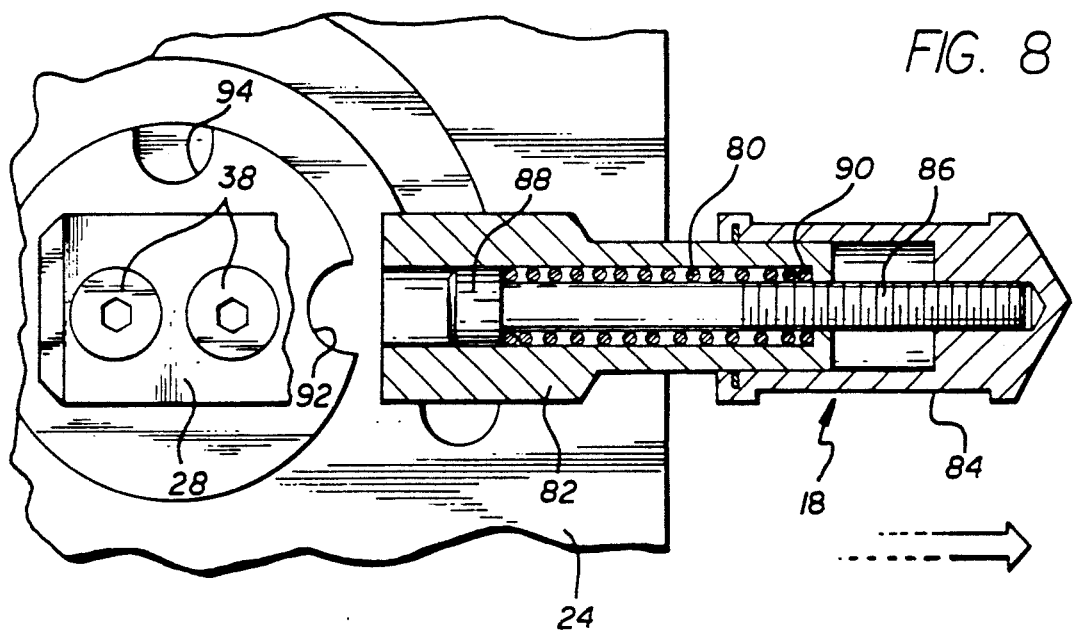
FIG. 8 is a fragmented top plan view depicting one of the ball valve units, and illustrating a valve handle in an extended position.
Figure 9:
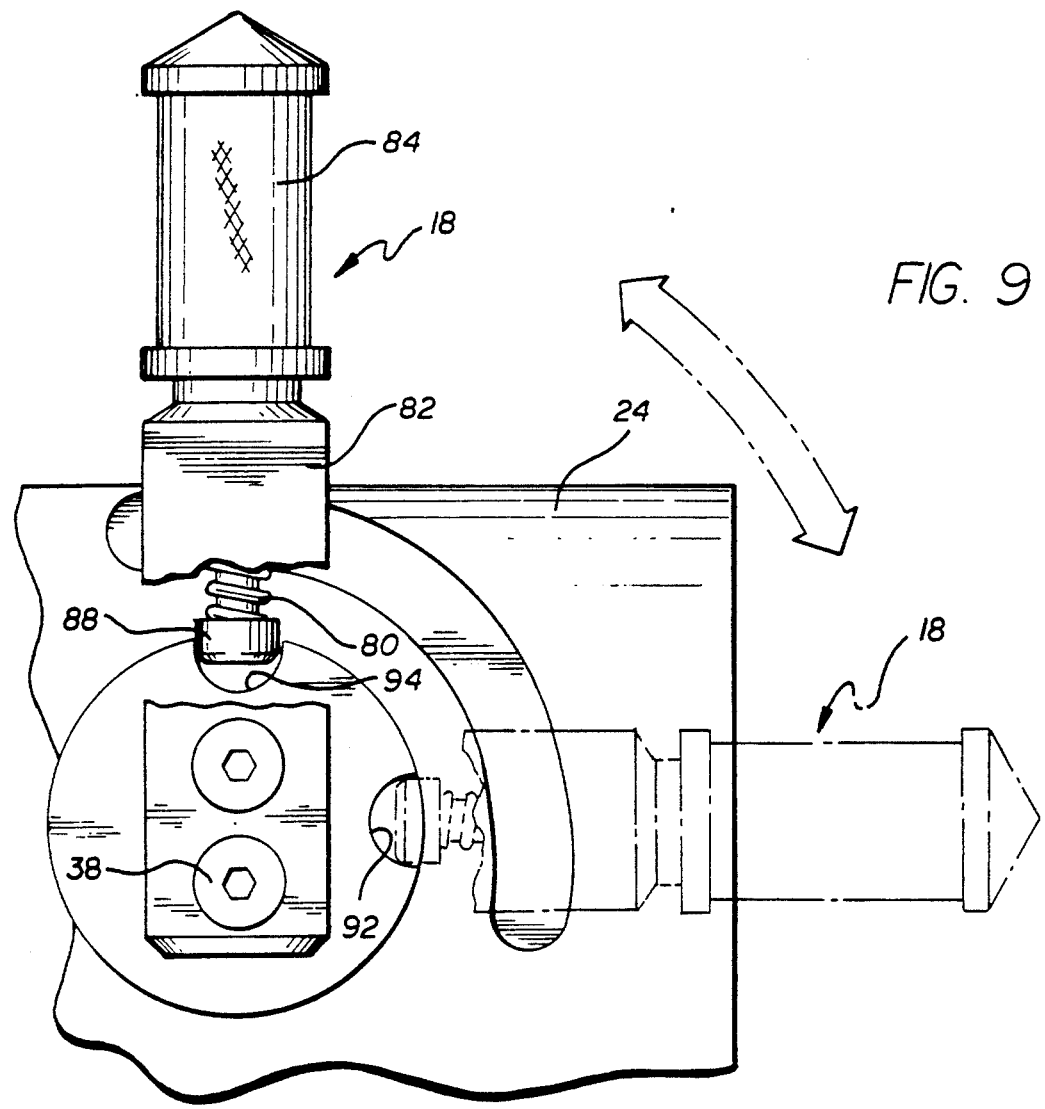
FIG. 9 is a fragmented top plan view similar to FIG. 8 and illustrating the valve handle in an alternative position of adjustment.

When it is desired to rotate the ball valve from the closed position to the open position, or vice versa, the outer handle member 84 can be longitudinally extended against the spring 80, thereby providing an elongated handle structure for easy manual rotation with increased moment arm. Importantly, such extension of the handle as viewed in FIG. 8 carries the head 88 of the stop pin from the associated detent 92, 94, thereby releasing the ball valve 20 for the desired rotational movement. The handle 18 can then be pivoted quickly and easily to the alternative position, such as movement from the open position to the closed position as viewed in FIGS. 8 and 9, followed by release of the outer handle member 84 and resultant spring return of the head 88 into the detent 92, 94 aligned therewith.

In accordance with a further aspect of the invention, each ball valve unit 12 additionally includes an open-ended port 96 (FIG. 1) formed in the end face 40 thereof at a selected position adjacent to the larger lock lug 48. This port 96 is provided to permit engagement of each ball valve unit with a non-identical but commercially used ball valve unit having an axially protruding detent pin operated by a valve handle, of the type shown and described in U.S. Pat. No. 4,438,779. When the ball valve unit of the present invention is mated with a non-identical prior art unit of this type, the safety lock-out key 22 functions in the same manner to prevent ball valve opening until full engagement is achieved, and to prevent separation of the coupling until the ball valve is closed.

A variety of further modifications and improvements to the present invention will be apparent to those skilled in the art. Accordingly, no limitation on the invention is intended by way of the foregoing description and accompanying drawings, except as set forth in the appended claims.

What is claimed is:

1. In a ball valve coupling including first and second ball valve units having interengageable lug means for releasibly connecting said ball valve units in face-to-face relation, said first ball valve unit including a ball valve movable between open and closed positions, the improvement comprising:
   a safety lock-out key mounted on said first ball valve unit for movement from a first position toward a second position in response to partial engagement of said lug means on said first and second ball valve units; and
   a stem pin mounted on said first ball valve unit for movement with said ball valve between said open and closed positions;
   said safety lock-out key engaging said stem pin when said lock-out key is moved from said first position and when said ball valve is in said closed position to prevent movement of said ball valve to said open position;
   said stem pin engaging said lock-out key when said lock-out key is in said first position and when said ball valve is in the open position to prevent movement of said lock-out key from said first position.

2. The ball valve coupling of claim 1 wherein said lock-out key and said stem pin are in spaced relation when said lock-out key is in said first position to permit movement of the ball valve between the open and closed positions.

3. The ball valve coupling of claim 1 wherein said first and second ball valve units are identical.

4. The ball valve coupling of claim 1 wherein said second ball valve unit includes a ball valve movable between open and closed positions.

5. The ball valve coupling of claim 1 wherein said first ball valve unit includes externally accessible handle means for moving said ball valve between the open and closed positions.

6. The ball valve of claim 5 wherein said handle means include telescopic handle members and spring means for urging said telescopic handle members to a normal collapsed position, said handle members being manually extensible to provide an increased moment arm for rotation of said ball valve between the open and closed positions.

7. The ball valve unit of claim 6 wherein said handle means further includes detent means for normally locking said handle means against rotation when said handle members are in said normal collapsed position.

8. The ball valve coupling of claim 1 wherein said safety lock-out key is in said first position when said first and second ball valve units are fully engaged.

9. In a ball valve unit having a valve body defining a central flow passage extending therethrough to an end face, a ball valve mounted within said flow passage for movement between open and closed positions, handle means for moving said ball valve between said open and closed positions, a lock lug protruding from said end face, a lug recess formed in said end face, and an undercut lock channel formed in said end face with an entrance end opening to said lug recess, the improvement comprising:
   a safety lock-out key mounted within a track formed in said valve body for sliding movement between an advanced position protruding into said lug recess, and a retracted position withdrawn from said lug recess;
   means for urging said lock-out key normally to said advanced position; and
   a stem pin carried by the ball valve for movement therewith, said stem pin being oriented when the ball valve is closed for reception into a keyway formed on said lock-out key to permit movement of said lock-out key between said advanced and retracted positions, said lock-out key engaging said stem pin when said stem pin is received into said keyway to prevent movement of the ball valve from said closed position to said open position;
   said stem pin being spaced from said keyway when said lock-out key is in the advanced position to permit movement of the ball valve between said open and closed positions, said stem pin engaging said lock-out key when the ball valve is in said open position to block movement of said lock-out key from said advanced position.

10. The ball valve unit of claim 9 wherein said means for urging said lock-out key normally to said advanced position comprises a spring.

11. The ball valve unit of claim 9 wherein the ball valve is rotatable about a fixed axis upon movement thereof between the open and closed positions, said stem pin being carried by the ball valve in an off-axis position.

12. The ball valve unit of claim 9 wherein said lock-out key includes a head protruding at least partially into said lug recess when said lock-out key is in the advanced position, said head having a ramped face thereon on one side thereof disposed adjacent to the undercut channel.

13. The ball valve unit of claim 9 wherein said lock-out key protrudes into said lug recess at a position in close proximity to the entrance end of said undercut channel.

14. The ball valve unit of claim 9 wherein said handle means include telescopic handle members and spring means for urging said telescopic handle members to a normal collapsed position, said handle members being manually extensible to provide an increased moment arm for rotation of said ball valve between the open and closed positions.

15. The ball valve unit of claim 14 wherein said handle means further includes detent means for normally locking said handle means against rotation when said handle members are in said normal collapsed position.

16. A ball vale coupling, comprising:
   a pair of ball valve units adapted for respective connection to a pair of fluid flow conduits, and further adapted for interconnection with each other in in-line, face-to-face relation;

each of said ball valve units including a valve body defining an end face, a central flow passage extending through said valve body to said end face, a face seal mounted at said end face in surrounding relation to said central flow passage, a ball valve mounted within said central flow passage for rotation between open and closed positions, a valve handle mounted on said valve body in an externally accessible position for manually displacing said ball valve between said open and closed positions, a lock lug protruding outwardly from said end face, a lug recess formed in said end face for slide-in reception of the lock lug on the other ball valve unit when said ball valve units are interconnected, and means forming an undercut lock channel for receiving the lock lug on the other ball valve unit upon slide-in reception of said lock lug into said lug recess and coaxial rotation of said ball valve units relative to each other;

each of said ball valve units further including a safety lock-out key mounted within a track formed in said valve body and movable between an advanced position protruding at least partially into said lug recess and a retracted position withdrawn from said lug recess, means for urging said lock-out key normally to said advanced position, and a stem pin carried by said ball valve for movement therewith;

said stem pin having a size and shape for reception into a keyway formed in said lock-out key when said ball valve is in the closed position to permit movement of said lock-out key to said retracted position when said lock-out key is engaged by the lock lug on the other ball valve unit as said ball valve units are interconnected, said lock-out key engaging said stem pin while said lock-out key is in the retracted position to prevent movement of said ball valve to the open position, said stem pin being spaced from said keyway when said lock-out key is in said advanced position to permit movement of said ball valve to the open position, said stem pin being oriented when said ball valve is in the open position to block movement of said lock-out key from said advanced position toward said retracted position.

* * * * *